(12) United States Patent
Koyama

(10) Patent No.: US 10,758,995 B2
(45) Date of Patent: Sep. 1, 2020

(54) ELECTRODE CHIP ATTACHMENT DEVICE

(71) Applicant: HONDA MOTOR CO., LTD., Minato-Ku, Tokyo (JP)

(72) Inventor: Yuhei Koyama, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 443 days.

(21) Appl. No.: 15/700,819

(22) Filed: Sep. 11, 2017

(65) Prior Publication Data

US 2018/0071853 A1 Mar. 15, 2018

(30) Foreign Application Priority Data

Sep. 14, 2016 (JP) .................................. 2016-179644

(51) Int. Cl.
*B23K 9/28* (2006.01)
*B23K 11/30* (2006.01)

(52) U.S. Cl.
CPC .............. *B23K 9/285* (2013.01); *B23K 9/287* (2013.01); *B23K 11/3018* (2013.01)

(58) Field of Classification Search
CPC ..... B23K 9/285; B23K 9/287; B23K 11/3018
USPC ...... 219/137.62, 137.63, 60 A, 60 R, 61, 72, 219/74, 75, 125.1, 125.11, 136; 228/44.5, 228/29, 212; 269/287
See application file for complete search history.

(56) References Cited

U.S. PATENT DOCUMENTS

| | | | | |
|---|---|---|---|---|
| 1,756,556 A | * | 4/1930 | Hollup | B23K 9/282 219/144 |
| 1,895,573 A | * | 1/1933 | Kiser | B23K 9/282 219/143 |
| 2,375,836 A | * | 5/1945 | Bourque | B23K 9/282 219/144 |
| 2,419,789 A | * | 4/1947 | Paulson | B23K 9/282 219/144 |
| 2,479,127 A | * | 8/1949 | Loucks | B23K 9/282 219/144 |
| 2,692,520 A | * | 10/1954 | Hayes | E21B 19/16 269/223 |
| 2,847,883 A | * | 8/1958 | Bagby | B23B 47/28 408/105 |

(Continued)

FOREIGN PATENT DOCUMENTS

| | | |
|---|---|---|
| CN | 103465006 A | 12/2013 |
| CN | 104416278 A | 3/2015 |
| JP | H03-184673 A | 8/1991 |

OTHER PUBLICATIONS

Office Action issued in the corresponding Indian Patent Application No. 201744032022 dated Nov. 21, 2019.

*Primary Examiner* — Jimmy Chou
(74) *Attorney, Agent, or Firm* — Carrier Blackman & Associates, P.C.; Joseph P. Carrier; William D. Blackman

(57) ABSTRACT

In an electrode chip attachment device, a guide member which is formed such that the guide member can be divided into a first half member and a second half member with a division surface that is passed though the communication hole and that is parallel to the axial direction and a coupling shaft serving as a separate mechanism which separates the first half member and the second half member from each other when the chip holder is pushed into the first tapered portion and the second tapered portion from the opposite side of the electrode chip and which passes the chip holder to the side of the electrode chip.

6 Claims, 6 Drawing Sheets

(56) References Cited

U.S. PATENT DOCUMENTS

| | | | | |
|---|---|---|---|---|
| 2,899,536 A * | 8/1959 | Hoese et al. | ........... | B23K 9/282 |
| | | | | 219/70 |
| 2,932,995 A * | 4/1960 | Durfee | ................ | B23B 47/281 |
| | | | | 408/115 R |
| 2,935,597 A * | 5/1960 | Hugo | ................ | B23K 9/282 |
| | | | | 219/140 |
| 3,236,516 A * | 2/1966 | Young | ................ | B25B 1/103 |
| | | | | 269/252 |
| 3,659,072 A * | 4/1972 | Carkhuff | ................ | B23K 9/28 |
| | | | | 219/70 |
| 3,837,633 A * | 9/1974 | Paulsen | ................ | B01L 9/06 |
| | | | | 269/128 |
| 4,045,649 A * | 8/1977 | Moss | ................ | B23K 9/013 |
| | | | | 219/143 |
| 4,150,276 A * | 4/1979 | Moss | ................ | B23K 9/013 |
| | | | | 219/144 |
| 4,300,033 A * | 11/1981 | Scarton | ................ | B23K 9/013 |
| | | | | 219/70 |
| 4,315,126 A * | 2/1982 | Schaefer | ................ | B23K 9/013 |
| | | | | 219/140 |
| 4,317,024 A * | 2/1982 | Moss | ................ | B23K 9/28 |
| | | | | 219/144 |
| 4,445,678 A * | 5/1984 | George | ................ | B23Q 3/104 |
| | | | | 269/282 |
| 4,464,555 A * | 8/1984 | Wallis | ................ | B23K 9/285 |
| | | | | 219/69.1 |
| 4,527,037 A * | 7/1985 | Johnson | ................ | B23K 9/282 |
| | | | | 219/69.1 |
| 4,571,478 A * | 2/1986 | Johnson | ................ | B23K 9/282 |
| | | | | 219/69.1 |
| 4,628,779 A * | 12/1986 | Louis | ................ | B23B 13/02 |
| | | | | 82/126 |
| 4,713,515 A * | 12/1987 | Choi | ................ | B23H 7/26 |
| | | | | 219/69.15 |
| 4,739,682 A * | 4/1988 | Birkestrand | ................ | B23B 5/163 |
| | | | | 269/284 |
| 4,761,531 A * | 8/1988 | Moss | ................ | B23K 9/282 |
| | | | | 219/70 |
| 4,948,935 A * | 8/1990 | Moss | ................ | B23K 9/013 |
| | | | | 219/70 |
| 4,958,818 A * | 9/1990 | Buchter | ................ | B25B 1/2473 |
| | | | | 269/136 |
| 5,219,376 A * | 6/1993 | Vinohradsky | ................ | B23H 7/26 |
| | | | | 219/69.11 |
| 5,382,313 A * | 1/1995 | Eminger | ................ | B41F 16/00 |
| | | | | 156/579 |
| 5,623,858 A * | 4/1997 | Birkestrand | ................ | B23B 5/162 |
| | | | | 408/104 |
| 5,655,699 A * | 8/1997 | McGushion | ................ | B23K 9/0286 |
| | | | | 228/44.5 |
| 5,806,173 A * | 9/1998 | Honma | ................ | B21D 39/20 |
| | | | | 29/727 |
| 5,942,133 A * | 8/1999 | Moss | ................ | B23K 9/013 |
| | | | | 219/69.1 |
| D413,906 S * | 9/1999 | Tremblay | ................ | D15/122 |
| 6,075,219 A * | 6/2000 | Furukawa | ................ | B23K 11/318 |
| | | | | 219/119 |
| 6,082,235 A * | 7/2000 | Kramer | ................ | B23B 5/162 |
| | | | | 82/113 |
| 6,185,818 B1 * | 2/2001 | Ito | ................ | B23C 3/18 |
| | | | | 29/889.7 |
| 6,268,580 B1 * | 7/2001 | Boyer, Jr. | ................ | B23H 7/26 |
| | | | | 219/69.15 |
| 6,403,912 B1 * | 6/2002 | Nemecek | ................ | B23H 7/26 |
| | | | | 204/224 M |
| 7,002,094 B2 * | 2/2006 | Spitza | ................ | B23H 1/04 |
| | | | | 219/69.15 |
| 7,331,093 B2 * | 2/2008 | Ferrari | ................ | B23B 31/16216 |
| | | | | 269/225 |
| 8,450,648 B2 * | 5/2013 | Langley | ................ | B23K 9/282 |
| | | | | 219/138 |
| 8,714,536 B2 * | 5/2014 | Stadtfeld | ................ | B23F 23/06 |
| | | | | 269/287 |
| 9,126,290 B2 * | 9/2015 | Buttress | ................ | B23K 9/0286 |
| 10,245,696 B2 * | 4/2019 | Doettling | ................ | B23Q 1/66 |
| 10,335,884 B2 * | 7/2019 | Brambilla | ................ | B23K 25/005 |
| 2002/0005393 A1 * | 1/2002 | Rohrberg | ................ | B23K 9/028 |
| | | | | 219/60 A |
| 2002/0043519 A1 * | 4/2002 | Dobovsek | ................ | B23H 1/04 |
| | | | | 219/69.15 |
| 2002/0092837 A1 * | 7/2002 | Keats | ................ | B23K 9/28 |
| | | | | 219/142 |
| 2005/0189336 A1 * | 9/2005 | Ku | ................ | B23K 9/32 |
| | | | | 219/138 |
| 2006/0157536 A1 * | 7/2006 | Wolf | ................ | B25B 5/147 |
| | | | | 228/101 |
| 2008/0061487 A1 * | 3/2008 | Falk | ................ | F16L 3/1075 |
| | | | | 269/52 |
| 2011/0049106 A1 * | 3/2011 | Buttress | ................ | B23K 9/0286 |
| | | | | 219/67 |
| 2011/0174783 A1 * | 7/2011 | Suzuki | ................ | B23H 7/265 |
| | | | | 219/69.15 |
| 2013/0075370 A1 * | 3/2013 | Bigelow | ................ | B23H 1/00 |
| | | | | 219/69.15 |
| 2015/0053653 A1 | 2/2015 | Haeufgloeckner | | |
| 2015/0084260 A1 * | 3/2015 | Tokura | ................ | B21D 39/06 |
| | | | | 269/287 |
| 2015/0183048 A1 * | 7/2015 | Oliveira | ................ | B23K 11/0046 |
| | | | | 219/78.16 |
| 2017/0291296 A1 * | 10/2017 | Brown | ................ | B23K 9/0953 |

* cited by examiner

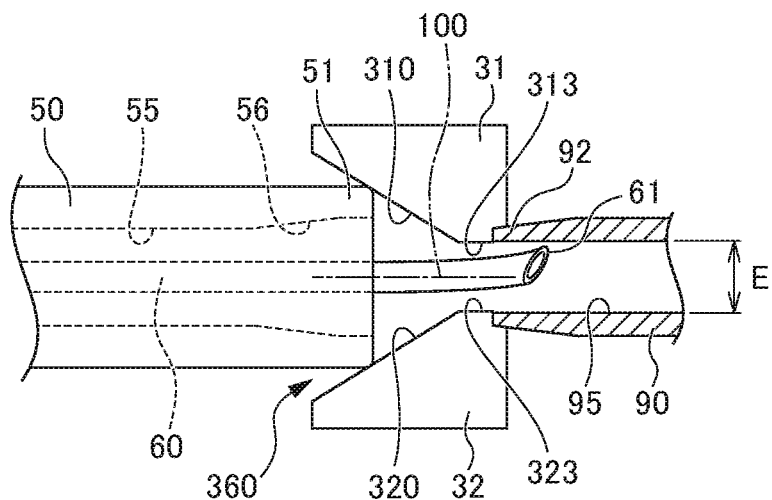
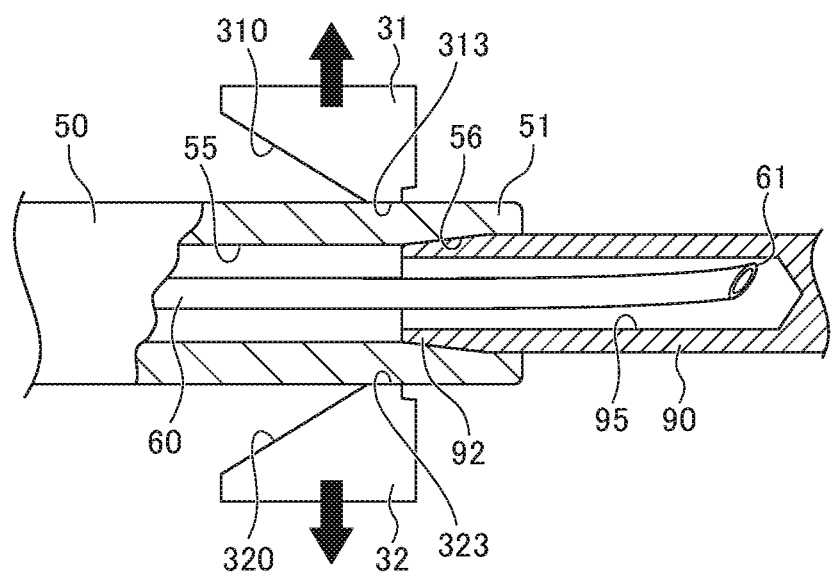

ELECTRODE CHIP ATTACHMENT DEVICE

This application is based on and claims the benefit of priority from Japanese Patent Application No. 2016-179644, filed on 14 Sep. 2016, the content of which is incorporated herein by reference.

BACKGROUND OF THE INVENTION

Field of the Invention

The present invention relates to an electrode chip attachment device for a welding device which attaches an electrode chip to a chip holder.

Related Art

Conventionally, an electrode chip attachment device for a welding device is known in which a tip end portion of a welding gun in a state where an electrode chip is previously removed is pushed into a replacement electrode chip set in a predetermined position and in which thus a new electrode chip is attached to the tip end portion of the welding gun. As a document which discloses this type of technology, for example, patent document 1 is present. Patent document 1 discloses a method and a device for automatically replacing electrode chips by attaching a pair of electrode chips which are arranged opposite a tip end portion of a so-called c-shaped gun.

Patent Document 1: Japanese Unexamined Patent Application, Publication No. H03-184673

SUMMARY OF THE INVENTION

Incidentally, since a welding current is passed through an electrode chip for welding, and thus the electrode chip significantly generates heat, cooling water is generally passed through the interior thereof. It is important to efficiently supply the cooling water to the back surface of the tip end portion of the electrode chip and thereby actively cool the tip end portion, and a tip end portion of a cooling water hose is generally extended to the vicinity of the back surface of the tip end portion of the welding chip.

In the case of the electrode chip as disclosed in patent document 1 in which a length in an axial direction is short, even when the electrode chip is removed from a chip holder arranged in a gun arm, the cooling water hose seldom remains extended to the outside of the chip holder. However, in the case of an electrode chip in which a length in an axial direction is relatively long, a cooling water hose may remain extended to the outside from a chip holder in a state where the electrode chip is removed. Depending on the position and the direction of the cooling water hose which is extended out of the chip holder, when the chip holder is fitted into the electrode chip, for example, the cooling water hose is caught therein, with the result that the electrode chip may be prevented from being attached.

An object of the present invention is to provide an electrode chip attachment device which can reliably attach an electrode chip that is set to a chip holder regardless of whether or not a cooling water hose is extended out of the chip holder.

According to the present invention, there is provided an electrode chip attachment device (for example, an electrode chip attachment device 1 which will be described later) for attaching an electrode chip of a welding device (for example, a welding gun 5 which will be described later) including a tubular chip holder (for example, a chip holder 50 which will be described later) which has a hollow portion (for example, a hollow portion 55 which will be described later) and in which a cooling water hose (for example, a cooling water hose 60 which will be described later) passing cooling water is arranged and an electrode chip which is detachably mounted on the chip holder and which has a water jacket (for example, a water jacket 95 which will be described later) into which the cooling water flow from the cooling water hose, the electrode chip attachment device comprising: a base portion (for example, a base portion 10, 210 which will be described later) on which the electrode chip is placed before being fitted to the chip holder; and a guide member (for example, a guide member 20 which will be described later) which is arranged on a base end side of the electrode chip placed on the base portion, where in the guide member, a guide surface portion (for example, a first tapered portion 310 and a second tapered portion 320 which will be described later) which is tapered from an opening portion (for example, an opening portion 360 which will be described later) formed in a surface on an opposite side of the electrode chip to be larger than a tip end portion of the chip holder toward the side of the electrode chip and a communication hole (for example, a communication hole 33 which will be described later) which is arranged on the side of the electrode chip in the guide surface portion and which makes, in a position corresponding to a base end portion of the electrode chip set on the base portion, the side of the electrode chip in the guide member communicate with an opposite side thereof are formed, the guide member is formed such that the guide member can be divided into a first division member (for example, a first half member 31 which will be described later) and a second division member (for example, a second half member 32 which will be described later) with a division surface (for example, a division surface 100 which will be described later) that is passed though the communication hole and that is parallel to an axial direction of the electrode chip, the communication hole is formed to have such a diameter that the cooling water hose is passed through the communication hole and the electrode chip attachment device further includes a separate mechanism (for example, a coupling shaft 35 which will be described later) which separates the first division member and the second division member from each other when the chip holder is pushed into the guide surface portion from the opposite side of the electrode chip and which passes the chip holder to the side of the electrode chip.

In this way, even when the cooling water hose extended out from the tip end of the chip holder is eccentric from the axis line of the chip holder, the cooling water hose is brought into contact with the guide surface ahead of the chip holder, and is thereafter passed though the communication hole and is guided to the base end portion of the electrode chip. Thus, it is possible to reliably prevent an event in which the cooling water hose does not enter the water jacket of the electrode chip and is caught between the chip holder and the electrode chip. Since the electrode chip can be fitted only by the movement of the chip holder with the welding device, it is possible to realize the simple and efficient configuration for automatically attaching the electrode chip.

Preferably, the electrode chip attachment device further includes a cover member (for example, a cover member 40 which will be described later) which covers at least an upper portion of a tip end portion of the electrode chip placed on the base portion.

In this way, it is possible to prevent, with the cover member, the adherence of sputters and the like to the electrode chip set on the base portion of the electrode chip attachment device.

Preferably, the welding device includes a pair of gun arms (for example, gun arms 5A and 5B which will be described later) in each of which the chip holder is arranged and which apply a pressure force to work at the time of welding, and in a state where a tip end portion (for example, a tip end portion 91 of an electrode chip 90 which will be described later) of the gun arm (for example, the gun arm 5B which will be described later) of the pair of gun arms which is not involved in an operation of attaching the electrode chip abuts on the electrode chip attachment device, the pressure force of the pair of gun arms is applied such that the chip holder to which the electrode chip is not fitted is pushed to the side of the electrode chip.

In this way, it is possible to perform the operation of fitting the chip holder and the electrode chip by utilization of the pressure force (grip strength) of the gun arms which have the function of pressurizing the work at the time of welding.

Preferably, the electrode chip attachment device further includes the cover member (for example, a cover member 40 which will be described later) which covers at least the upper portion of the tip end portion of the electrode chip placed on the base portion, where in a state where the movement of the electrode chip placed on the base portion is regulated by the cover member and where the tip end portion of the gun arm which is not involved in the operation of attaching the electrode chip abuts on the cover member, the pressure force of the pair of gun arms is applied.

In this way, the posture of the cover member can be assisted by the gun arm on the other side, and thus it is possible to reduce the force necessary for holding the posture of the cover member. For example, in the configuration in which the position of an axial direction locating member is held by the actuator, it is possible to reduce the size of the actuator.

According to the electrode chip attachment device of the present invention, it is possible to reliably attach an electrode chip set to a chip holder regardless of whether or not a cooling water hose is extended out of the chip holder.

BRIEF DESCRIPTION OF THE DRAWINGS

FIG. 4B is a plan cross-sectional view schematically showing a state when the guide member in the electrode chip attachment device of the present embodiment and the chip holder are brought into contact with each other;

FIG. 4C is a plan cross-sectional view schematically showing a state where the electrode chip is fitted to the chip holder by the guide member in the electrode chip attachment device of the present embodiment;

DETAILED DESCRIPTION OF THE INVENTION

A preferred embodiment of the present invention will be described below with reference to drawings.

Figure 1:
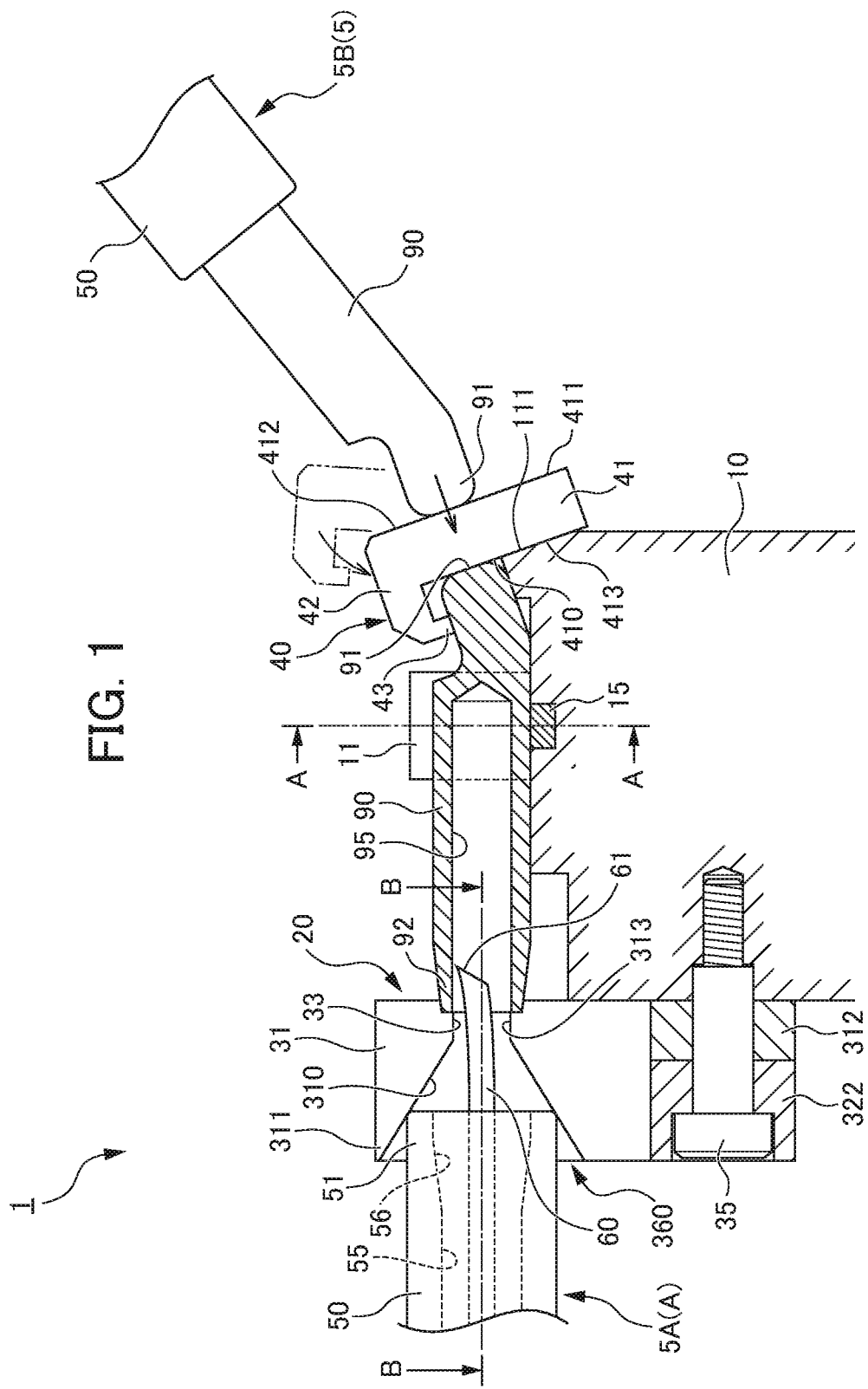
FIG. 1 is a cross-sectional view schematically showing a state where an electrode chip attachment device according to an embodiment of the present invention is used to attach an electrode chip to a holder.
Figure 2:
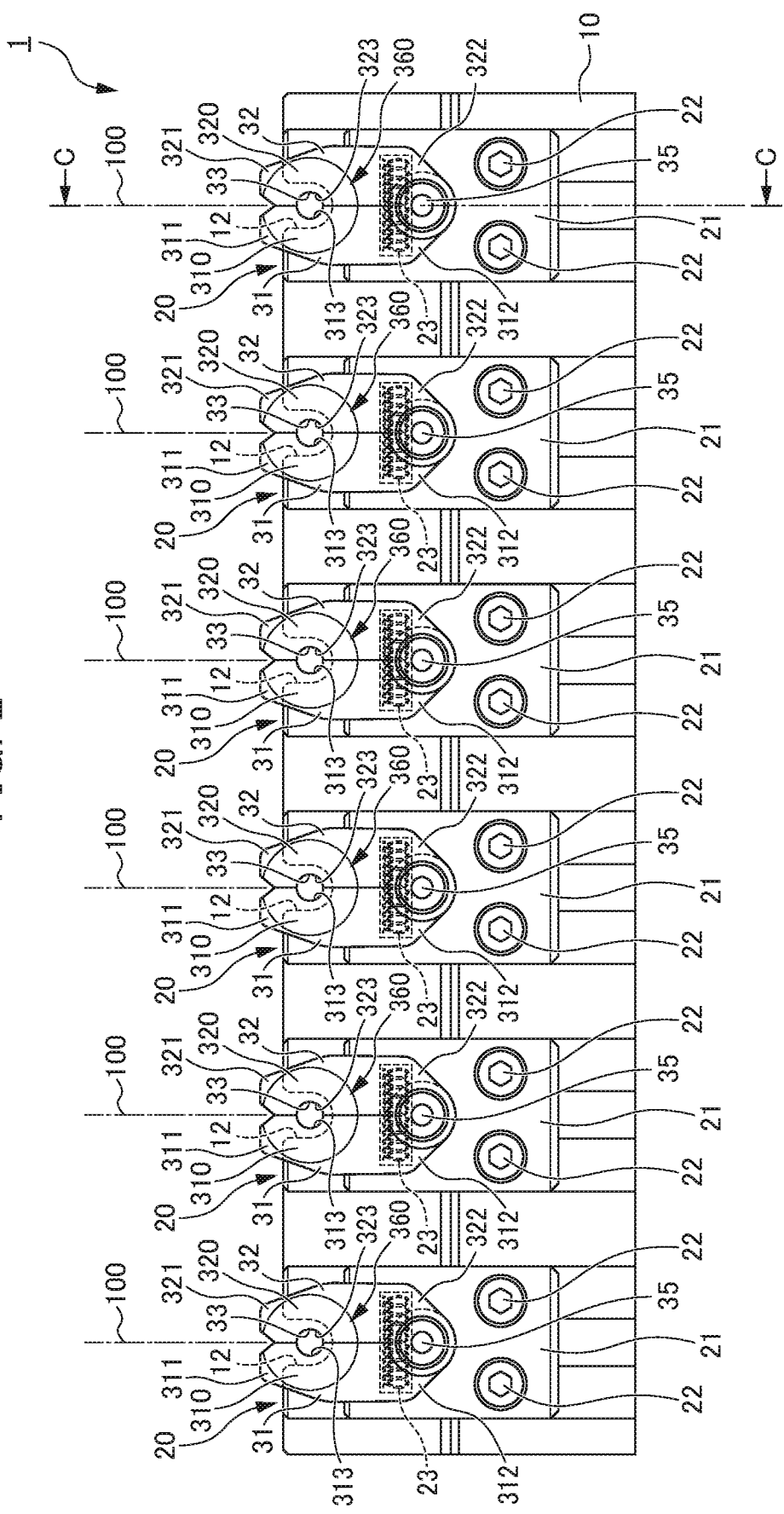
FIG. 2 is a front view showing the electrode chip attachment device of the present embodiment.

FIG. 1 is a cross-sectional view (which corresponds to a cross section taken along line C-C in FIG. 2) schematically showing a state where an electrode chip attachment device 1 according to an embodiment of the present invention is used to attach an electrode chip 90 to a chip holder 50. The electrode chip attachment device 1 shown in FIG. 1 is an electrode chip attachment device for spot welding which is used for a welding gun 5 having a pair of gun arms 5A and 5B, and the welding gun 5 is a so-called c-shaped gun in which the pair of gun arms 5A and 5B are formed in the shape of the letter C.

The configurations of the welding gun 5 and the electrode chip 90 will first be described. On the front surface side of the electrode chip attachment device 1 of FIG. 1, the chip holder 50 is shown which is included in the welding gun 5, which is arranged in the gun arm 5A on one side and to which the electrode chip 90 is not fitted. On the right side of the plane of the figure, the chip holder 50 is shown which is arranged in the gun arm 5B on the other side and to which the electrode chip 90 is attached.

The welding gun 5 is formed so as to be able to move, with a robot arm (unillustrated) or the like, the gun arms 5A and 5B to intended positions. The pair of gun arms 5A and 5B include a pressurization mechanism (unillustrated) in which work to be welded is sandwiched from both sides through the electrode chips 90 of the chip holders 50 and in which a predetermined pressure force is applied.

The chip holder 50 arranged in each of the gun arms 5A and 5B is formed in the shape of a tube having a hollow portion 55 with a bottom. At the tip end of the chip holder 50, a fitting portion 56 is formed which makes the hollow portion 55 communicate with the outside and to which a base end portion 92 of the electrode chip 90 is fitted.

The hollow portion 55 of the chip holder 50 is extended in an axial direction, and in its internal space, a cooling water hose 60 which is likewise extended in the axial direction is arranged. The cooling water hose 60 of the present embodiment is extended from the base end side of the chip holder 50 to the tip end side, and is extended through the hollow portion 55 and the fitting portion 56 to the outside of the chip holder 50. Hence, a hose tip end portion 61 of the cooling water hose 60 is extended out from the tip end of the chip holder 50 to which the electrode chip 90 is not fitted. In the hose tip end portion 61 of the present embodiment, its tip end surface is formed in the shape of a cut end (tapered shape) which is inclined with respect to a plane perpendicular to the axial direction.

The electrode chips 90 which are fitted to the chip holders 50 and which have the same shape are used. The electrode chip 90 includes a water jacket 95 in which cooling water is supplied from the cooling water hose 60 to the interior thereof. The water jacket 95 is an internal space which is extended in the axial direction from the end surface of the electrode chip 90 on the base end side to the tip end side, and is a space in which the hose tip end portion 61 of the cooling water hose 60 is accommodated in a state where the electrode chip 90 is fitted to the chip holder 50.

The electrode chip 90 is tapered such that the outer circumferential surface of the base end portion 92 is narrowed as the outer circumferential surface is extended to the base end side, and functions as an electrode chip side fitting portion which is fitted to the chip holder 50 of the welding gun 5.

The welding gun 5 performs spot welding in a state where the electrode chips 90 are attached to the pair of gun arms 5A and 5B. The welding gun 5 sandwiches and pressurizes the work where a plurality of metal members such as steel plates are overlaid with the tip end portions 91 of the electrode chips 90 which are fitted to the chip holders 50 and which are opposite each other, passes a current between the electrode chips 90 in a state where a predetermined pressure force or more is maintained and thereby welds the work. The cooling water hose 60 is connected to the supply source (unillustrated) of the cooling water serving as a cooling medium, and supplies the cooling water to the water jacket 95 of the electrode chip 90 attached to the chip holder 50 so as to cool the tip end portion 91 of the electrode chip 90. Since the cooling water hose 60 deeply enters the water jacket 95 of the electrode chip 90, it is possible to actively cool the temperature of the tip end portion 91 of the electrode chip 90.

Figure 3:
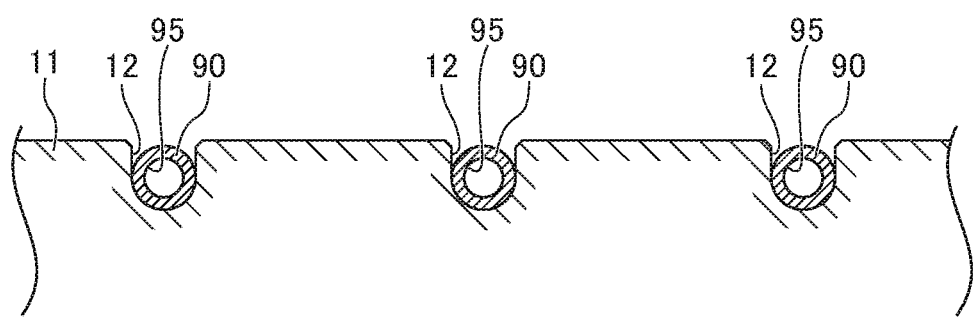
FIG. 3 is a front cross-sectional view showing the shape of a locating portion in the electrode chip attachment device of the present embodiment.

The configuration of the electrode chip attachment device 1 which attaches the electrode chip 90 to the chip holder 50 will then be described. FIG. 2 is a front view showing the electrode chip attachment device 1 according to the present embodiment. FIG. 3 is a front cross-sectional view showing the shape of a locating portion 11 in the electrode chip attachment device 1 of the present embodiment, and is a cross-sectional view taken along line A-A in FIG. 1. In the following discussion, directions will be described with reference to the front view of FIG. 2. The front view in the present specification is a point of view when the electrode chip attachment device 1 is seen from the base end side of the electrode chip 90 set to the electrode chip attachment device 1 (in FIG. 2, the electrode chip 90 is located on the back surface side of a guide member 20 which will be described later). A left/right direction and an up/down direction will be described with reference to the front view of FIG. 2. A forward/backward direction is a direction in which the chip holder 50 is moved to which the electrode chip 90 is attached for the electrode chip attachment device 1, and is the same direction as the axial direction of the electrode chip 90 set to the electrode chip attachment device 1. The front side in the forward/backward direction is the back surface side of the electrode chip attachment device 1, and the back side is the front surface side of the electrode chip attachment device 1. When the axial direction is simply mentioned, the axial direction means the axial direction of the electrode chip 90 set to the electrode chip attachment device 1, the front side in the axial direction also means the base end side (the front side of the plane of FIG. 2) of the electrode chip 90 and the back side in the axial direction means the tip end side (the back side of the plane of FIG. 2) of the electrode chip 90.

The electrode chip attachment device 1 of the present embodiment includes, as the main configuration, a base portion 10 to which a plurality of electrode chips 90 can be set, a cover member 40 which covers the set electrode chips 90 and a plurality of guide members 20 which guide the electrode chips 90 set to the base portion 10.

In the base portion 10, the locating portion 11 for setting the electrode chips 90 is provided on its upper portion. As shown in FIG. 3, in the locating portion 11, a plurality of concave portions 12 corresponding to the circumferential surfaces of the electrode chips 90 are formed in the left/right direction, and thus a plurality of electrode chips 90 can be set simultaneously. The movement of the electrode chip 90 in the left/right direction is regulated by the concave portion 12.

In a position of the base portion 10 in which the electrode chip 90 is set, a proximity sensor 15 is embedded, and thus it is possible to detect whether or not the electrode chip 90 set in the concave portion 12 of the locating portion 11 is present and to detect whether or not the electrode chip 90 is placed in a proper posture. The position of the proximity sensor 15 can be changed as necessary to a place where it is possible to determine whether or not the electrode chip 90 is present.

The cover member 40 will then be described. The cover member 40 is arranged on the back side of the base portion 10 in the axial direction. The cover member 40 is coupled to an actuator (unillustrated) which is arranged in the base portion 10. The actuator is a drive mechanism which includes a drive source such as a hydraulic cylinder, an air cylinder or a motor. The cover member 40 can be moved by the actuator between a cover position which covers an upper portion of the tip end portions 91 of the electrode chip 90 and a separate position (position indicated by dashed lines in FIG. 1) which is separated from the electrode chip 90.

The cover member 40 of the present embodiment includes: a wall portion 41 which stands up on the back side with respect to the electrode chip 90 set to the base portion 10; a canopy portion 42 which is extended so as to cover the tip end portion 91 of the electrode chip 90 from the upper end of the wall portion 41; and a holding portion 43 which is protruded from the tip end of the canopy portion 42 to the side of the electrode chip 90 set to the base portion 10.

In the wall portion 41, in a state where the cover member 40 is in the cover position, its surface 410 on the front side in the axial direction abuts on the tip end portion 91 of the electrode chip 90 set to the base portion 10, and thus the wall portion 41 functions as an axial direction locating member for locating the electrode chip 90 in the axial direction. In the present embodiment, a cover reception surface 111 is formed, in an upper portion of the base portion 10 on the back surface side, which is inclined to the front surface side according to the shape of the electrode chip 90 whose tip end portion 91 is inclined upward as the cover reception surface 111 is extended upward. The cover position and the shape of the cover member 40 are set such that thus the wall portion 41 of the cover member 40 is inclined to the front side in the axial direction as the abutting surface 413 of the cover member 40 abuts on the cover reception surface 111.

In a surface 411 of the wall portion 41 on the back side in the axial direction, a reception surface 412 is formed on which the tip end portion 91 of the electrode chip 90 fitted to the chip holder 50 of the gun arm 5B on the other side abuts. The surface 411 of the wall portion 41 on the back side in the axial direction receives a pressure force from the gun arm 5B, and thus the posture of the cover member 40 is also appropriately held in the cover position, with the result that an operation for fitting the electrode chip 90 with the guide member 20 which will be described later can be smoothly performed.

The canopy portion 42 is formed so as to cover at least an upper portion of the tip end portion 91 of the electrode chip 90 in a state where the cover member 40 is in the cover position. In this way, even when sputters produced by a welding operation or the like are scattered, the electrode chip 90 set to the base portion 10 is protected by the canopy portion 42.

The holding portion 43 is brought into contact with an upper portion of the electrode chip 90 set to the base portion 10 in a state where the cover member 40 is in the cover position, and functions as an up/down direction locating member for locating the electrode chip 90 in the up/down direction.

As described above, the cover member 40 also has the function of serving as the axial direction locating member for locating the electrode chip 90. When the cover member 40 is moved to the separate position, the contact between the cover member 40 and the electrode chip 90 is released, with the result that locating is released.

The cover member 40 of the present embodiment is formed so as to be wide in the left/right direction. The range which can be covered by the cover member 40 corresponds to all the electrode chips 90 set to a plurality of guide members 20 aligned in the left/right direction. In this way, with the one cover member 40, it is possible to cover and locate the upper portions of the tip end portions 91 of all the electrode chips 90 set to the base portion 10.

The guide member 20 will then be described. As shown in FIG. 2, the guide member 20 of the present embodiment includes a base stage 21, a first half member 31, a second half member 32, a coupling shaft 35 and a biasing mechanism 23.

As shown in FIG. 2, the base stage 21 is fixed to the front surface of the base portion 10 with bolts 22 serving as fastening members. The base stage 21 is a base on which the individual components of the guide member 20 are arranged, and may be a component independent of the base portion 10 or may be a component integral therewith. In FIG. 1, the base stage 21 is shown as the component integral with the base portion 10.

The first half member 31 and the second half member 32 are a pair member consisting of the two members, and is a member which forms a guide surface portion that guides the chip holder 50 and the cooling water hose 60 extended from the chip holder 50 to the water jacket 95 of the electrode chip 90. A division surface 100 of the first half member 31 and the second half member 32 is a surface which is along the up/down direction and the axial direction of the electrode chip 90.

The base end portion 312 of the first half member 31 and the base end portion 322 of the second half member 32 are overlaid on each other in the axial direction, and the coupling shaft 35 is inserted through the overlaid portion and is fixed to the base stage 21 (see FIG. 1). The first half member 31 and the second half member 32 are formed such that the coupling shaft 35 is used as a turning shaft and that the first half member 31 and the second half member 32 can be turned away from each other from a closed position in which the tip end portion 311 of the first half member 31 and the tip end portion 321 of the second half member 32 face each other.

In the base stage 21, the biasing mechanism 23 is incorporated which applies such a biasing force that the tip end portion 311 of the first half member 31 and the tip end portion 321 of the second half member 32 approach each other. In this way, when the first half member 31 and the second half member 32 are on standby, the tip end portion 311 and the tip end portion 321 face each other in the left/right direction, and the first half member 31 and the second half member 32 are in the closed position in which the gap between the first half member 31 and the second half member 32 is minimized. The biasing mechanism 23 uses, for example, an elastic member such as a spring, and for a structure using a coil spring or a torsion spring, the type of spring (elastic member), a coupling structure and the like, appropriate methods can be adopted.

In the tip end portion 311 of the first half member 31, a first tapered portion 310 is formed, and in the tip end portion 321 of the second half member 32, a second tapered portion 320 is formed. In a state where the first half member 31 and the second half member 32 are in the closed position, the first tapered portion 310 and the second tapered portion 320 are formed in the shape of a mortar (general cone) which is opened at the end surface on the front side in the axial direction and which is narrowed toward the back side in the axial direction.

Figure 5:
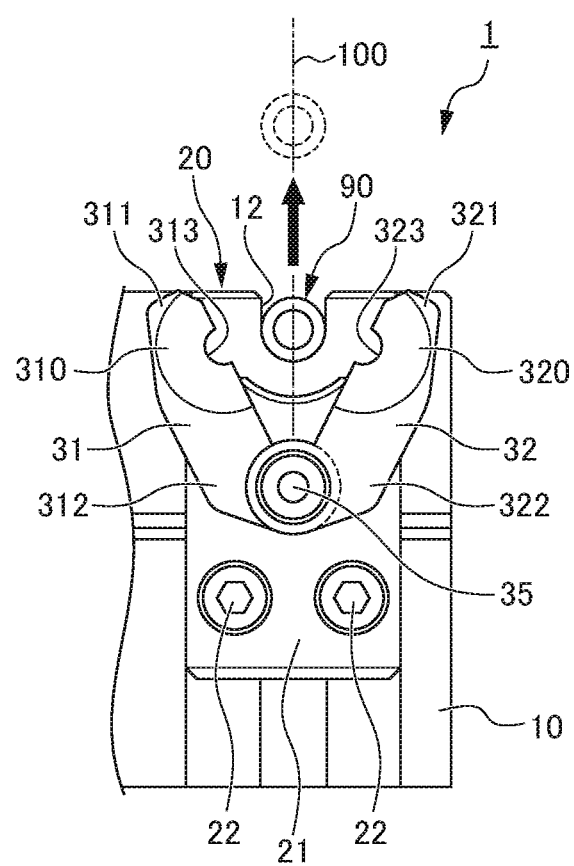
FIG. 5 is an enlarged front view schematically showing a state where after the completion of the fitting of the electrode chip of the present embodiment, the fitted electrode chip is separated by a gun arm from the guide member.

In the back side of the first tapered portion 310 of the first half member 31 in the axial direction, a semicircular first cutout portion 313 is formed when seen in the axial direction, and in the back side of the second tapered portion 320 of the second half member 32 in the axial direction, a semicircular second cutout portion 323 is formed when seen in the axial direction (see FIGS. 2 and 5). In the state where the first half member 31 and the second half member 32 are in the closed position, the first cutout portion 313 and the second cutout portion 323 form a communication hole 33 which penetrates from the portion corresponding to the mortar-shaped bottom portion formed with the first tapered portion 310 and the second tapered portion 320 to the back side in the axial direction. The communication hole 33 makes a space of the guide member 20 on the front side in the axial direction communicate with a space on the back side.

The movement of the guide member 20 when the electrode chip 90 is attached and a size relationship of the individual portions thereof will be described with reference to FIGS. 4A to 4C.

Figure 4A:
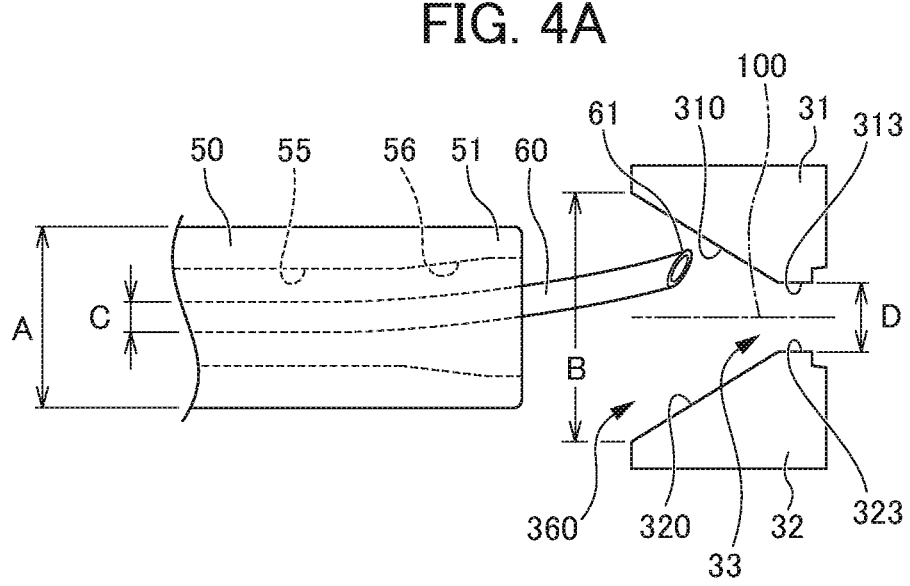
FIG. 4A is a plan cross-sectional view schematically showing a state before a guide member in the electrode chip attachment device of the present embodiment and the chip holder are brought into contact with each other.

FIG. 4A is a plan cross-sectional view schematically showing a state before the guide member 20 in the electrode chip attachment device 1 of the present embodiment and the chip holder 50 are brought into contact with each other, and corresponds to a cross section taken along line B-B in FIG. 1. As shown in FIG. 4A, in a state where the electrode chip 90 is not fitted, the hose tip end portion 61 of the cooling water hose 60 is extended out from the tip end of the chip holder 50. As shown in FIG. 1, in the operation of attaching the electrode chip 90, the cover member 40 is moved to the cover position in which the electrode chip 90 is located. The gun arm 5B that is different from the gun arm 5A to which the electrode chip 90 of the welding gun 5 is attached and that is in the process of fitting the electrode chip 90 is arranged in a position in which the gun arm 5B abuts on or is opposite the reception surface 412 formed in the surface 411 of the wall portion 41 of the cover member 40 on the back side in the axial direction. In a state where the electrode chip 90 is not fitted, the gun arm 5B may be arranged in the position which the gun arm 5B abuts on or is opposite the reception surface 412.

The guide member 20 of the present embodiment is formed such that the diameter B of an opening portion 360 (start end portion of the tapered portion on the front side in the axial direction) of guide surfaces in the first tapered portion 310 and the second tapered portion 320 is larger than the diameter A of the outer shape of a tip end portion 51 of the chip holder 50. The opening portion 360 of the guide surfaces is formed so as to be larger than the chip holder 50, and thus the chip holder 50 can be smoothly moved to the back side in the axial direction without being caught in the opening portion 360 of the guide surfaces. Since the opening portion 360 is formed so as to be larger than the chip holder 50, the cooling water hose 60 which is extended out of the interior of the chip holder 50 can be reliably brought into contact with the first tapered portion 310 or the second tapered portion 320 so as to be guided to the side of the communication hole 33.

FIG. 4B is a plan cross-sectional view (which corresponds to the cross section taken along line B-B) schematically showing a state when the guide member 20 in the electrode chip attachment device 1 of the present embodiment and the chip holder 50 are brought into contact with each other. As shown in FIG. 4B, since the hose tip end portion 61 of the cooling water hose 60 is guided by the first tapered portion 310 or the second tapered portion 320, the cooling water hose 60 is passed though the communication hole 33 to enter the internal space (the water jacket 95) of the electrode chip 90 when the chip holder 50 is brought into contact with the first tapered portion 310 or the second tapered portion 320.

The guide member 20 is formed such that the diameter D of the communication hole 33 formed with the first cutout portion 313 and the second cutout portion 323 is larger than the diameter C of the cooling water hose 60. The diameter of the communication hole 33 is formed so as to be smaller than the diameter E of the hollow portion (water jacket 95) of the electrode chip 90. The electrode chip 90 is arranged such that the opening end of the water jacket 95 communicates with the back side of the communication hole 33 in the axial direction, and the hose tip end portion 61 of the cooling water hose 60 passed through the communication hole 33 reliably enters the interior of the electrode chip 90 on the back side of the guide member 20 in the axial direction. In other words, a relationship of the diameter C of the cooling water hose<the diameter D of the communication hole 33<the diameter E of the opening end of the water jacket 95 is made to hold true, and thus it is possible to realize the configuration in which the hose tip end portion 61 extended out of the chip holder 50 can be reliably guided to the inner side of the electrode chip 90.

FIG. 4C is a plan cross-sectional view (which corresponds to the cross section taken along line B-B) schematically showing a state where the electrode chip 90 is fitted to the chip holder 50 by the guide member 20 in the electrode chip attachment device 1 of the present embodiment. When the chip holder 50 is further moved to the back side in the axial direction from the state (the state shown in FIG. 4B) where the chip holder 50 is in contact with the guide member 20, the first tapered portion 310 and the second tapered portion 320 are pushed by the chip holder 50 outward (direction of arrows) in the left/right direction.

By a force applied from the chip holder 50, the tip end portion 311 of the first half member 31 and the tip end portion 321 of the second half member 32 are separated, with the coupling shaft 35 serving as a turning center, away from each other, and thus the chip holder 50 can be moved to the back side in the axial direction. The gun arm 5A further pushes the chip holder 50 toward the back side in the axial direction up to a position in which the base end portion 92 of the electrode chip 90 is fitted to the fitting portion 56.

In the fitting operation of the present embodiment, not only a force applied by the robot arm but also a grip strength (the pressure force applied by the pressurization mechanism described previously) for applying the pressure force with which the work is sandwiched by the pair of gun arms 5A and 5B at the time of welding is utilized. As shown in FIG. 1, the tip end portion 91 of the electrode chip 90 abuts on the surface 410 of the wall portion 41 of the cover member 40 on the front side in the axial direction. The tip end portion 91 of the electrode chip 90 in the gun arm 5B on the other side is in contact with the surface 411 on the back side in the axial direction which is the back side of the wall portion 41. In this state, as the work is pressurized at the time of welding, the pressure force is applied in such a direction that the electrode chips 90 arranged in the chip holders 50 in the pair of gun arms 5A and 5B approach each other.

The cover member 40 can receive the force for pushing the chip holder 50 applied by the gun arm 5A while the back side (the surface 411 on the back side in the axial direction) of the cover member 40 is being supported by the gun arm 5B. Even when the position in which the electrode chip 90 on the side of the gun arm 5B is brought into contact with the cover member 40 is slightly displaced, the position is corrected to an appropriate position by the action of clamps for the gun arms 5A and 5B.

With the assistance of the gun arm 5B, the cover member 40 is prevented from falling down to the back side by the pushing of the chip holder 50. Only the cover member 40 does not need to receive a load applied by the gun arm 5A and thus a force necessary for holding the posture of the cover member 40 in the cover position at the time of the fitting is decreased. With the result that it is possible to reduce the size of the actuator described previously. The abutting surface 413 of the cover member 40 abuts on the cover reception surface 111 of the base portion 10, and thus the cover member 40 is located. The force received from the chip holder 50 is received here by the base portion 10, and thus it is not necessary for the actuator of the cover member 40 to receive it.

FIG. 5 is an enlarged front view schematically showing a state where after the completion of the fitting of the electrode chip 90 of the present embodiment, the fitted electrode chip 90 is separated by the gun arm 5A from the guide member 20. In FIG. 5, the chip holder 50 and the gun arm 5A are not illustrated.

After the completion of the operation of fitting the electrode chip 90, the cover member 40 is moved by the actuator described above to the separate position. When in a state where the cover member 40 is moved to the separate position, the welding gun 5 moves the gun arm 5A upward, as the chip holder 50 is moved, the first half member 31 and the second half member 32 are temporarily separated in the left/right direction and the chip holder 50 to which the electrode chip 90 is fitted is separated from the electrode chip attachment device 1. The first half member 31 and the second half member 32 in the guide member 20 are returned to the closed position by the biasing force of the biasing mechanism 23. In this way, the operation of attaching the electrode chip 90 is completed. It is possible to perform the operation of attaching the electrode chip 90 to the gun arm 5B with the same procedure.

According to the electrode chip attachment device 1 of the present embodiment described above, the following effects are achieved. Specifically, the electrode chip attachment device 1 includes the base portion 10 on which the electrode chip 90 is placed before being fitted to the chip holder 50; and the guide member 20 which is arranged on the base end side of the electrode chip 90 placed on the base portion 10. In the guide member 20, the first tapered portion 310 and the second tapered portion 320 serving as the guide surface portion which is tapered from the opening portion 360 formed in the surface on the opposite side of the electrode chip 90 to be larger than the tip end portion 51 of the chip holder 50 toward the side of the electrode chip 90 and the communication hole 33 which is arranged on the side of the electrode chip 90 in the first tapered portion 310 and the second tapered portion 320 and which makes, in the position corresponding to the base end portion of the electrode chip 90 set on the base portion 10, the side of the electrode chip 90 in the guide member 20 communicate with the opposite side thereof are formed. And the guide member 20 is formed such that the guide member 20 can be divided into the first half member 31 and the second half member 32 with the division surface 100 that is passed though the communication hole 33 and that is parallel to the axial direction. The communication hole 33 is formed to have such a diameter that the cooling water hose 60 is passed through the communication hole 33. The electrode chip attachment device 1 further includes the coupling shaft 35 serving as a separate mechanism which separates the first half member 31 and the second half member 32 from each other when the chip holder 50 is pushed into the first tapered portion 310 and the second tapered portion 320 from the opposite side of the electrode chip 90 and which passes the chip holder 50 to the side of the electrode chip 90. In this way, even when the cooling water hose 60 extended out from the tip end of the chip holder 50 is eccentric from the axis line of the chip holder 50, the cooling water hose 60 is brought into contact with the first tapered portion 310 and the second tapered portion 320 ahead of the chip holder 50, and is thereafter passed though the communication hole 33 and is guided to the base end portion 92 of the electrode chip 90. Thus, it is possible to reliably prevent an event in which the cooling water hose 60 does not enter the water jacket 95 of the electrode chip 90 and is caught between the chip holder 50 and the electrode chip 90. Since the electrode chip 90 can be fitted only by the movement of the chip holder 50 with the welding gun 5, it is possible to realize the simple and efficient configuration for automatically attaching the electrode chip 90.

The cover member 40 of the present embodiment is formed so as to cover at least an upper portion of the tip end portion 91 of the electrode chip 90 placed on the base portion 10. In this way, it is possible to prevent, with the cover member 40, the adherence of sputters and the like to the electrode chip 90 set on the base portion 10 of the electrode chip attachment device 1.

The welding gun 5 of the present embodiment includes the pair of gun arms 5A and 5B in each of which the chip holder 50 is arranged and which apply a pressure force to the work at the time of welding, and in a state where the tip end portion 91 of the electrode chip 90 of the gun arm 5B of the pair of gun arms 5A and 5B which is not involved in the operation of attaching the electrode chip 90 abuts on the electrode chip attachment device 1, the pressure force of the pair of gun arms 5A and 5B is applied such that the chip holder 50 is pushed to the side of the electrode chip 90. In this way, it is possible to perform the operation of fitting the chip holder 50 and the electrode chip 90 by utilization of the pressure force (grip strength) of the gun arms 5A and 5B which have the function of pressurizing the work at the time of welding.

The electrode chip attachment device 1 of the present embodiment further includes the cover member 40 which is arranged in such a position as to regulate the movement of the electrode chip 90 placed on the base portion 10 to the tip end side in the axial direction, and in a state where the tip end portion 91 of the electrode chip 90 of the gun arm 5B which is not involved in the operation of attaching the electrode chip 90 abuts on the surface 411 on the back side in the axial direction on the back side of the surface 410 on the front side in the axial direction on which the tip end portion 91 of the electrode chip 90 located in the cover member 40 abuts, the pressure force of the pair of gun arms 5A and 5B is applied. In this way, the locating of the cover member 40 can be assisted by the gun arm 5B on the other side, and thus it is possible to reduce the force necessary for locating. As in the present embodiment, in the configuration in which the position of the cover member 40 is held by the actuator, it is possible to reduce the size of the actuator, with the result that it is possible to realize the miniaturization of the configuration of the device.

Although the preferred embodiment of the present invention is described above, the present invention is not limited to the embodiment described above and modifications are possible as necessary.

Although in the embodiment described above, the division surface 100 of the first half member 31 and the second half member 32 is along the up/down direction, the present invention can be applied even when the division surface 100 is along the horizontal direction. Although the guide member 20 is divided into the two members of the first half member 31 and the second half member 32, a configuration in which the guide member 20 is divided into three or more members can be adopted depending on the conditions. Although in the embodiment described above, the first tapered portion 310 and the second tapered portion 320 are formed in the shape of a cone, the present invention is not limited to the embodiment, and any shape may be adopted as long as the surfaces are inclined with respect to the division surface 100.

Although in the embodiment described above, the electrode chip 90 is located in the axial direction and the up/down direction by the cover member 40, the electrode chip 90 can be located by another member. Although the cover member 40 of the present embodiment covers the upper portion of the tip end portion 91 of the electrode chip 90, the shape of the cover member 40 can be changed so as to cover the entire electrode chip 90.

Figure 6:
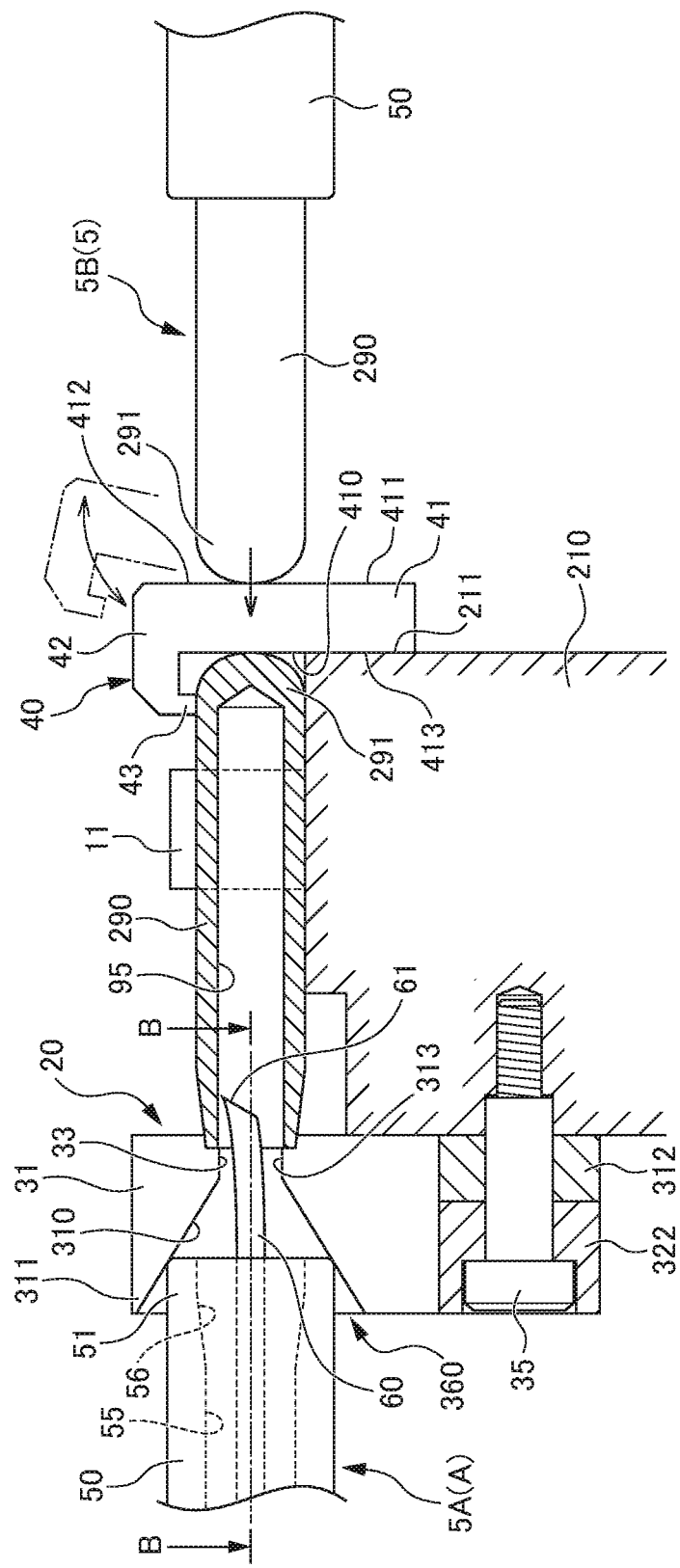
FIG. 6 is a cross-sectional view schematically showing a state where an electrode chip attachment device of a variation is used to attach an electrode chip to a holder.

The electrode chip 90 is not limited to the configuration of the embodiment described above, and can be changed as necessary according to the conditions. A variation in which an electrode chip different from that in the embodiment described above is used will then be described. FIG. 6 is a cross-sectional view schematically showing a state where an electrode chip attachment device 201 of the variation is used to attach an electrode chip 290 to a chip holder 50. The same configurations as in the embodiment described above are identified with the same reference numerals, and the descriptions thereof will be omitted.

As shown in FIG. 6, in the electrode chip attachment device 201 of the variation, the shape of the electrode chip 290 which is set and is to be attached is different. In the electrode chip 290 of the variation, its tip end portion 291 is extended straight without being inclined. A base portion 210 is formed so as to correspond to the shape of the electrode chip 90, and the back surface side which is extended in the up/down direction serves as a cover reception surface 211 which abuts on the abutting surface 413 of the cover member 40. Although in the present variation, the posture of the cover member 40 in the cover position is different from that in the embodiment described above, the configuration of the guide member 20 and the movement thereof at the time of, for example, fitting are the same. Even in the configuration of the present variation, the same actions and effects as described in the embodiment discussed above can be obtained. As described above, the configuration of the electrode chip to be attached can also be changed as necessary.

EXPLANATION OF REFERENCE NUMERALS 1, 201: electrode chip attachment device
5: welding gun (welding device)
5A, 5B: gun arm
20: guide member
31: first half member (first division member)
32: second half member (second division member)
33: communication hole
40: cover member
50: chip holder
55: hollow portion
60: cooling water hose
90, 290: electrode chip
95: water jacket
100: division surface
310: first tapered portion (guide surface portion)
320: second tapered portion (guide surface portion)
360: opening portion

What is claimed is:

1. An electrode chip attachment device for attaching an electrode chip of a welding device including a tubular chip holder which has a hollow portion and in which a cooling water hose passing cooling water is arranged and an electrode chip which is detachably mounted on the chip holder and which has a water jacket into which the cooling water flows from the cooling water hose, the electrode chip attachment device comprising:
    a base portion on which the electrode chip is placed before being fitted to the chip holder; and
    a guide member which is arranged on a base end side of the electrode chip placed on the base portion,
    wherein in the guide member,
    a guide surface portion and a communication hole are formed,
    the guide surface portion which is tapered from an opening portion formed in a surface on an opposite side of the electrode chip being larger than a tip end portion of the chip holder toward a side of the electrode chip, and
    the communication hole which is arranged on the side of the electrode chip in the guide surface portion making, in a position corresponding to a base end portion of the electrode chip set on the base portion, the side of the electrode chip communicate with an opposite side thereof in the guide member,
    the guide member is divided into a first division member and a second division member with an imaginary division surface that is passed though the communication hole and that is parallel to an axial direction of the electrode chip,
    the communication hole has such a diameter that the cooling water hose is passed through the communication hole,
    wherein the electrode chip attachment device further includes a separate mechanism which separates the first division member and the second division member from each other when the chip holder is pushed into the guide surface portion from the opposite side of the electrode chip and which passes the chip holder to the side of the electrode chip, and
    wherein the guide surface portion is formed substantially in a shape of a cone in a state where the first division member and the second division member are in a closed position.

2. An electrode chip attachment device for attaching an electrode chip of a welding device including a tubular chip holder which has a hollow portion and in which a cooling water hose passing cooling water is arranged and an electrode chip which is detachably mounted on the chip holder and which has a water jacket into which the cooling water flows from the cooling water hose, the electrode chip attachment device comprising:
    a base portion on which the electrode chip is placed before being fitted to the chip holder;
    a guide member which is arranged on a base end side of the electrode chip placed on the base portion; and
    a cover member which covers at least an upper portion of a tip end portion of the electrode chip placed on the base portion,
    wherein in the guide member,
    a guide surface portion and a communication hole are formed,
    the guide surface portion which is tapered from an opening portion formed in a surface on an opposite side of the electrode chip being larger than a tip end portion of the chip holder toward a side of the electrode chip, and
    the communication hole which is arranged on the side of the electrode chip in the guide surface portion making, in a position corresponding to a base end portion of the electrode chip set on the base portion, the side of the electrode chip communicate with an opposite side thereof in the guide member,
    the guide member is divided into a first division member and a second division member with an imaginary division surface that is passed though the communication hole and that is parallel to an axial direction of the electrode chip,
    the communication hole has such a diameter that the cooling water hose is passed through the communication hole, and
    wherein the electrode chip attachment device further includes a separate mechanism which separates the first division member and the second division member from each other when the chip holder is pushed into the guide surface portion from the opposite side of the electrode chip and which passes the chip holder to the side of the electrode chip.

3. The electrode chip attachment device according to claim 1, wherein the welding device includes a pair of gun arms in each of which the chip holder is arranged and which apply a pressure force to work at a time of welding, and
    in a state where a tip end portion of the gun arm of the pair of gun arms which is not involved in an operation of attaching the electrode chip abuts on the electrode chip attachment device, the pressure force of the pair of gun arms is applied such that the chip holder to which the electrode chip is not fitted is pushed to the side of the electrode chip.

4. An electrode chip attachment device for attaching an electrode chip of a welding device including a tubular chip holder which has a hollow portion and in which a cooling water hose passing cooling water is arranged and an electrode chip which is detachably mounted on the chip holder and which has a water jacket into which the cooling water flows from the cooling water hose, the electrode chip attachment device comprising:

a base portion on which the electrode chip is placed before being fitted to the chip holder;

a guide member which is arranged on a base end side of the electrode chip placed on the base portion; and a cover member which covers at least an upper portion of a tip end portion of the electrode chip placed on the base portion, wherein in the guide member, a guide surface portion and a communication hole are formed, the guide surface portion which is tapered from an opening portion formed in a surface on an opposite side of the electrode chip being larger than a tip end portion of the chip holder toward a side of the electrode chip, and the communication hole which is arranged on the side of the electrode chip in the guide surface portion making, in a position corresponding to a base end portion of the electrode chip set on the base portion, the side of the electrode chip communicate with an opposite side thereof in the guide member, the guide member is divided into a first division member and a second division member with an imaginary division surface that is passed though the communication hole and that is parallel to an axial direction of the electrode chip, the communication hole has such a diameter that the cooling water hose is passed through the communication hole, wherein the electrode chip attachment device further includes a separate mechanism which separates the first division member and the second division member from each other when the chip holder is pushed into the guide surface portion from the opposite side of the electrode chip and which passes the chip holder to the side of the electrode chip, wherein the welding device includes a pair of gun arms in each of which the chip holder is arranged and which apply a pressure force to work at a time of welding, and in a state where a tip end portion of the gun arm of the pair of gun arms which is not involved in an operation of attaching the electrode chip abuts on the electrode chip attachment device, the pressure force of the pair of gun arms is applied such that the chip holder to which the electrode chip is not fitted is pushed to the side of the electrode chip, and wherein in a state where a movement of the electrode chip placed on the base portion is regulated by the cover member and where the tip end portion of the gun arm which is not involved in the operation of attaching the electrode chip abuts on the cover member, the pressure force of the pair of gun arms is applied.

5. The electrode chip attachment device according to claim 2, wherein the welding device includes a pair of gun arms in each of which the chip holder is arranged and which apply a pressure force to work at a time of welding, and in a state where a tip end portion of the gun arm of the pair of gun arms which is not involved in an operation of attaching the electrode chip abuts on the electrode chip attachment device, the pressure force of the pair of gun arms is applied such that the chip holder to which the electrode chip is not fitted is pushed to the side of the electrode chip.

6. The electrode chip attachment device according to claim 5, wherein in a state where a movement of the electrode chip placed on the base portion is regulated by the cover member and where the tip end portion of the gun arm which is not involved in the operation of attaching the electrode chip abuts on the cover member, the pressure force of the pair of gun arms is applied.

\* \* \* \* \*